(12) United States Patent
Wang et al.

(10) Patent No.: US 7,917,412 B1
(45) Date of Patent: Mar. 29, 2011

(54) METHOD AND SYSTEM FOR COLLECTING INFORMATION

(75) Inventors: Gang Wang, San Diego, CA (US); Marie Jeanette Floyd Tahir, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 525 days.

(21) Appl. No.: 12/023,740

(22) Filed: Jan. 31, 2008

(51) Int. Cl.
*G06F 17/22* (2006.01)
(52) U.S. Cl. .............................. 705/31; 715/779; 715/738
(58) Field of Classification Search .................... 705/31; 715/738, 779
See application file for complete search history.

(56) References Cited

U.S. PATENT DOCUMENTS

2008/0189197 A1* 8/2008 Allanson et al. ................ 705/31
* cited by examiner

*Primary Examiner* — Ramsey Refai
(74) *Attorney, Agent, or Firm* — Osha • Liang LLP

(57) ABSTRACT

In general, the invention relates to a method for collecting information. The method includes receiving a request for user information from a preparer application executing on a preparer system and sending a notification of the request to a browser application executing on a user system, where the notification of the request is presented on a user interface of the browser application. The method further includes receiving the user information from the browser application, where the user information corresponds to content of the browser application. The method further includes sending a notification of receiving the user information to the preparer application, where the user information is used by the preparer application to prepare documentation, and where interactions with the browser application occur through a browser extension of the browser application.

25 Claims, 4 Drawing Sheets

METHOD AND SYSTEM FOR COLLECTING INFORMATION

BACKGROUND

Commonly when providing services, a professional (i.e., preparer) is required to gather information from a client (i.e., user). Specifically, the professional may be required to gather paperwork and information from the client for preparing documents at the request of the client. For example, a tax preparer may be required to obtain a variety of financial paperwork (e.g., 1099 forms, bank statements, receipts, etc.) from a client before the client's tax return can be processed.

Historically, a professional obtain information and paperwork for providing services directly from a client. However, with the advent of electronic communication, more professionals are interacting with clients electronically. Typically, a professional may request that a client provide information or documents via an electronic message. In this case, the professional may informally exchange a number of electronic messages with the client before obtaining the necessary information and/or documents for providing the services.

In other cases, a professional may provide the client with access to a document management system for sharing documents and/or information. A document management system may allow a client to provide information and/or upload files to a server system at the request of a professional. The professional may then obtain the information by accessing the server system. Similar to electronic message requests, the professional may be required to notify a client of the request a number of times before the information is provided by the client.

SUMMARY

In general, in one aspect, the invention relates to a method for collecting information. The method includes receiving a request for user information from a preparer application executing on a preparer system and sending a notification of the request to a browser application executing on a user system, where the notification of the request is presented on a user interface of the browser application. The method further includes receiving the user information from the browser application, where the user information corresponds to content of the browser application. The method further includes sending a notification of receiving the user information to the preparer application, where the user information is used by the preparer application to prepare documentation, and where interactions with the browser application occur through a browser extension of the browser application.

In general, in one aspect, the invention relates to a method for collecting information. The method includes receiving a notification of a request for user information from a collection system, where the notification of the request is presented on a user interface using a browser extension, and where the request is initiated by a preparer application executing on a preparer system. The method further includes capturing the user information from browser content using the browser extension and sending the user information to the collection system using the browser extension, where the collection system sends a notification of receiving the user information to the preparer application, where the user information is used by the preparer application to prepare documentation.

In general, in one aspect, the invention relates to a system for presenting business data. The system includes a preparer application interface configured to receive a request for user information from a preparer application executing on a preparer system and send a notification of receiving the user information to the preparer application, where the user information is used by the preparer application to prepare documentation. The system further includes a notification module configured to send a notification of the request to a browser application executing on a user system, where the notification of the request is presented on a user interface of the browser application. The system further includes a collection module configured to receive the user information from the browser application, where the user information corresponds to content of the browser application, and where interactions with the browser application occur through a browser extension of the browser application.

In general, in one aspect, the invention relates to a computer readable medium, embodying instructions executable by the computer to perform method steps for collecting information, the instructions including functionality to receive a request for user information from a preparer application executing on a preparer system and send a notification of the request to a browser application executing on a user system, where the notification of the request is presented on a user interface of the browser application. The instructions further include functionality to receive the user information from the browser application, where the user information corresponds to content of the browser application. The instructions further include functionality to send a notification of receiving the user information to the preparer application, where the user information is used by the preparer application to prepare documentation, and where interactions with the browser application occur through a browser extension of the browser application.

In general, in one aspect, the invention relates to a computer readable medium, embodying instructions executable by the computer to perform method steps for collecting information, the instructions including functionality to receive a notification of a request for user information from a collection system, where the notification of the request is presented on a user interface using a browser extension, and where the request is initiated by a preparer application executing on a preparer system. The instructions further include functionality to capture the user information from browser content using the browser extension and send the user information to the collection system using the browser extension, where the collection system sends a notification of receiving the user information to the preparer application, where the user information is used by the preparer application to prepare documentation.

Other aspects of the invention will be apparent from the following description and the appended claims.

DETAILED DESCRIPTION

Figure 1:
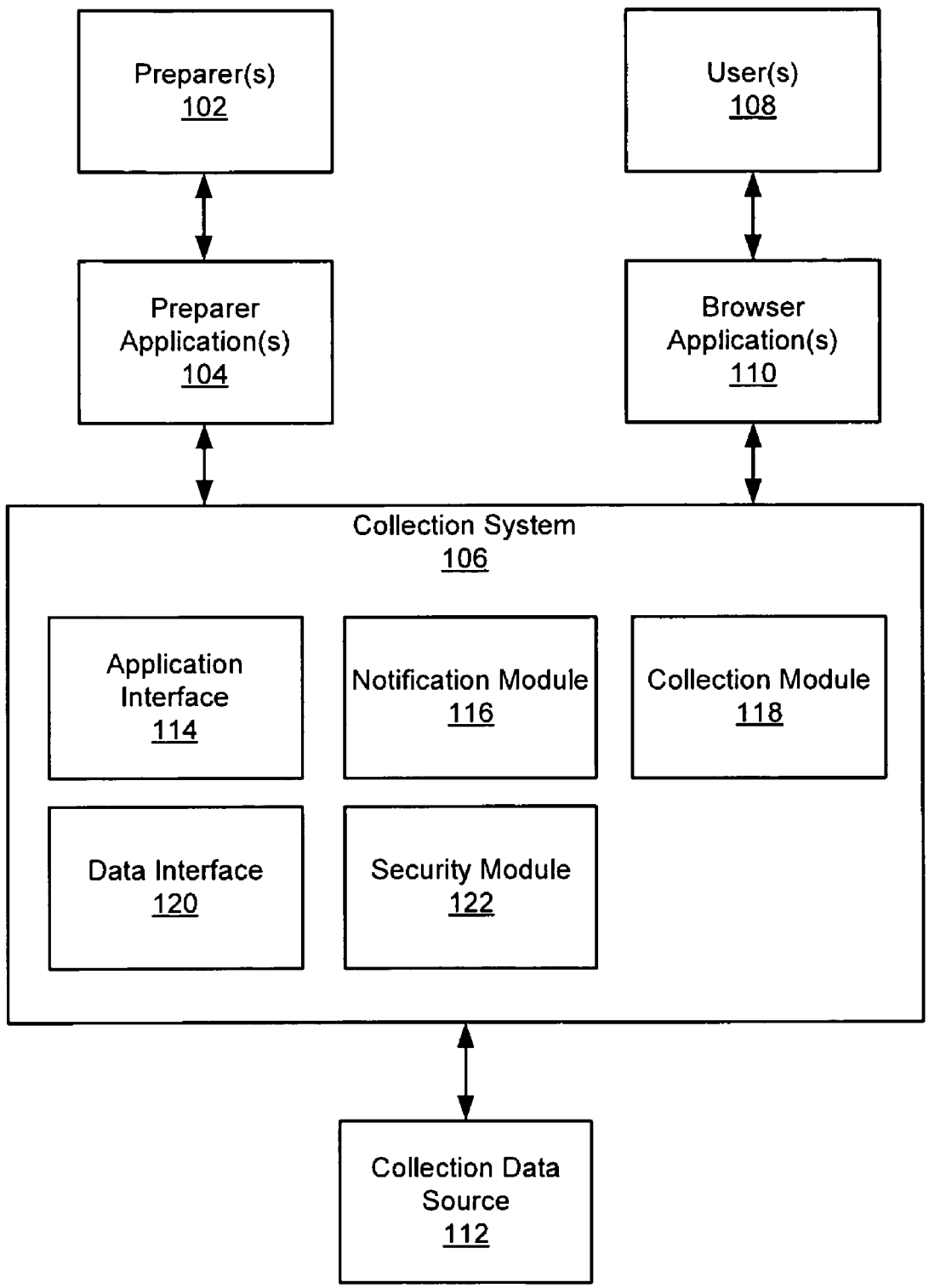
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to providing a method and a system for collecting information. More specifically, embodiments of the invention provide a method and system to obtain user information from a browser application, where the browser application includes a browser extension for collecting the user information.

In one or more embodiments of the invention, requests for user information may initiated by a preparers. A preparer may be a service provider (e.g., tax preparer, mortgage broker, accountant, attorney, etc.) in a variety of industries. Further, in one or more embodiments of the invention, a user may collect the user information based on notifications of requests presented on a user interface of the browser application. The user may be a client of the preparer (i.e., an individual who has consulted with the preparer to obtain services).

FIG. 1 shows a system for collecting information in accordance with one or more embodiments of the invention. The system includes a collection system (106) interacting with preparer application(s) (104), browser application(s) (110), and one or more collection data source (112). The preparer application(s) (104) further interacts with preparer(s) (102). The browser application(s) (110) further interacts with user(s) (108). The collection system (106) further includes a preparer application interface (114), a notification module (116), a collection module (118), and a data interface (120). Each of the aforementioned components of FIG. 1 is described below.

In one or more embodiments of the invention, the preparer(s) (102) may interact with preparer application(s) (104). The preparer(s) (102) may be service providers (e.g., tax preparers, mortgage brokers, accountants, attorneys, etc.) in a variety of industries. The preparer application(s) (104) may be a variety of applications (e.g., tax preparation software, accounting software) used by the preparer(s) to provide services. For example, a tax preparer may use tax preparation software to file a tax return for a client. The preparer application(s) (104) may be executing on one or more computer system(s) associated with the preparer(s) (102).

In one or more embodiments of the invention, the preparer application(s) (104) may also be configured to interact with the collection system (106). More specifically, the preparer(s) (102) may use preparer application(s) (104) to access the collection system (106) over the Internet (or other Wide Area Network or Local Area Network). For example, the preparer application(s) (104) may be web browser(s) for accessing web pages associated with the collection system (106). In another example, the preparer application(s) (104) may be application(s) running natively on the preparer(s)' (102) local computer(s) (not shown). Further, in one or more embodiments of the invention, the collection system (106) may interact with the preparer(s) (102) through use of direct notifications. The direct notifications may be conveyed by electronic mail, short message service (SMS), or some other form of correspondence.

In one or more embodiments of the invention, the user(s) (108) may interact with browser application(s) (110). The user(s) (108) may be clients of the preparer(s) (102). More specifically, the user(s) (108) may be individuals who have consulted with the preparer(s) (102) to obtain services. For example, a user (108) may interact with a tax preparer to file a tax return. The browser application(s) (110) may be any application capable of rendering Hypertext Markup Language (HTML). For example, the browser application(s) (110) may be web browser(s) used by the user(s) (108) to access web pages over the Internet (or other Wide Area Network or Local Area Network). The browser application(s) (110) may be executing on computer system(s) associated with the user(s) (108). Further, in one or more embodiments of the invention, the collection system (112) may interact with the user(s) (108) through use of direct notifications. The direct notifications may be conveyed by electronic mail, short message service (SMS), or some other form of correspondence.

In one or more embodiments of the invention, the browser application(s) (110) may provide support for browser extension(s). More specifically, the browser application(s) (110) may provide an open framework for adding features to the browser application(s) (110). In this case, a browser extension may be an application that extends the functionality of a browser application (110) using the open framework. The browser application(s) (110) may interact with the collection system (106) using the browser extension(s). Further, the browser extension(s) may be configured to interact with a user interface of the browser application(s) (110).

In one or more embodiments of the invention, the collection system (106) may be configured to interact with the preparer application(s) (104) using a preparer application interface (114). More specifically, the preparer application interface (114) may be configured to receive requests for user information from the preparer application(s) (104). Requests for user information may specify, but are not limited to, a user (108), guidance for obtaining the user information (e.g., directions for obtaining the user information, Uniform Resource Locator (URL), web address, etc.), and/or the preparer (102) initiating the request. Those skilled in the art will appreciate that the guidance for obtaining the user information may include direction(s) and/or location(s) for obtaining the user information specified in the request. For example, the guidance may specify a banking web page for obtaining bank statement information.

In one or more embodiments of information, the data specified in the requests for user information may correspond to metadata associated with the requests and/or user information. Optionally, the requests for user information may also include additional metadata describing the data specified in the requests for user information (i.e., provide a context for the specified data).

In one or more embodiments of the invention, the preparer application(s) (104) may be configured to allow preparer(s) (102) to specify data in a request for user information based on historical data provided by the collection system (106). More specifically, the preparer application(s) (104) may be configured to access a knowledge base of previous requests using the preparer application interface (114). For example, the preparer application(s) (104) may present a preparer (102) with potential guidance(s) based on historical guidance information while the preparer (102) is creating a request. The preparer application(s) (104) may also be configured to access historical user information of a user (108) specified in a request for user information. For example, the preparer application(s) (104) may recommend a due date for a request for user information based on the historical user information.

In one or more embodiments of the invention, the collection system (112) may be configured to obtain and store information in the collection data source (112). The collection data source (112) may be a data store (e.g., a database, a file system, one or more data structures configured in a memory, an extensible markup language (XML) file, some other medium for storing data, or any suitable combination thereof), which may include information (e.g., history of requests, user information, location information, preparer information, etc.) related to the collection of user information.

In one or more embodiments of the invention, the collection system (106) may be configured to send a notification of the request to a browser application (110). More specifically, the notification module (116) may be configured to send the notification of the request to a browser application (110) associated with a user (108) specified in the request. For example, the notification module (116) may be configured to send a notification of a request to a browser application (110) in response to the preparer application interface (114) receiving the request. In another example, the notification module (116) may be configured to send a notification of a request to a browser application (110) in response to a query from a browser extension of the browser application (110). In this example, the browser extension of the browser application (110) may be configured to poll the notification module (116) for requests for user information. Those skilled in the art will appreciate that the notification module (116) may be configured to send a batch of requests to a browser extension of the browser application (110).

In one or more embodiments of the invention, a browser extension of the browser application (110) may be configured to present notifications of requests for user information. For example, the browser extension may be configured to present one or more notification(s) by displaying an alert in a status bar of the browser application (110). In this example, the browser application (110) may be configured to present detailed information associated with the requests on a display device when the alert in the status bar is selected. Those skilled in the art will appreciate that the browser application (110) may be configured to allow the browser extension to interact with a variety of user interface components (e.g., status bar, tool bar, menu bar, etc.) of the browser application (110). Further, the browser application (110) may be configured to allow the browser extension to add controls (e.g., buttons, alerts, menus, etc.) to the user interface of the browser application (110).

In one or more embodiments of the invention, the browser extension of the browser application (110) may be configured to collect user information. More specifically, the browser extension may be configured to capture the content of the browser application (110). For example, the browser extension may be configured to obtain the HTML of the content displayed in the browser application (110). In another example, the browser extension may be configured to obtain a screen shot of the content displayed in the browser application (110). In one or more embodiments of the invention, the browser extension of the browser application (110) may also be configured to allow the user (108) to review information related to the collection of user information. More specifically, the browser extension may be configured to present information (e.g., preparer information, collected user information, destination of user information, etc.) associated with the collection of user information to be modified and/or verified by the user (108).

In one or more embodiments of the invention, the browser extension of the browser application (110) may be configured to send user information to the collection system (106). More specifically, the browser extension may be configured to send the user information to the collection module (118) of the collection system (106). The user information sent to the collection module (118) may specify the user and/or the request associated with the user information.

In one or more embodiments of the invention, the collection module (118) may be configured to receive user information from browser extension(s) of browser application(s) (110). Further, the collection module (118) may be configured to process the user information. More specifically, the collection module (118) may be configured to store the user information in a data collection source (112) using the data interface (120). In this case, the data interface (120) may associate the user information with the request for the user information and/or the user that submitted the user information.

In one or more embodiments of the invention, the collection system (106) may be configured to send notification of receiving the user information to a preparer application (104). More specifically, the preparer application interface (114) may be configured to send the notification of the request to a preparer application (104) associated with the request for the user information. For example, the preparer application interface (114) may be configured to send a notification of receiving user information to a preparer application (104) in response to the collection module (118) receiving the user information. In another example, the preparer application interface (114) may be configured to send a notification of receiving user information to a preparer application (104) in response to a query from the preparer application (104).

In one or more embodiments of the invention, the preparer application (104) may be configured to allow a preparer (102) to manage requests for user information. For example, the preparer application (104) may be configured to display a list of requests initiated by the preparer (102) including the status of the requests. In this example, the status of a request may be pending when the request is initiated and then become fulfilled when the user information specified in the request is received by the collection system (106). Once fulfilled, the preparer application (104) may obtain the user information. Further, in one or more embodiments of the invention, the preparer application (104) may be configured to generate documentation based on the user information. For example, the preparer application (104) may use the user information to generate documentation necessary to perform a tax return for a user (108). In other embodiments of the invention, the preparer application (104) and/or the collection system (106) may be configured to transmit the user information to external application(s) (not shown). In this case, the external application(s) may be configured to generate documentation (based on the user information) in a configurable or customizable manner.

Optionally, in one or more embodiments of the invention, the collection system (106) may further include a security module (122). The security module (122) may be configured to secure interactions with the preparer application(s) (104) and/or browser application(s) (110). More specifically, the security module (122) may be configured to authenticate communication from the preparer application(s) (104) and/or browser application(s) (110) based on security keys verifying the identity of the source of the communication. For example, a preparer application (104) may be associated with a security key allowing the preparer application (104) to interact with the preparer application interface (114). Further, the security module (122) may be configured to restrict requests for user information and access to user information. For example, a browser application (110) associated with a user (108) may be restricted to only receive requests for user information initiated by particular preparer(s) (102). Conversely, a preparer application (104) associated with a preparer (102) may be restricted to only access user information associated with particular user(s) (108).

Figure 2:
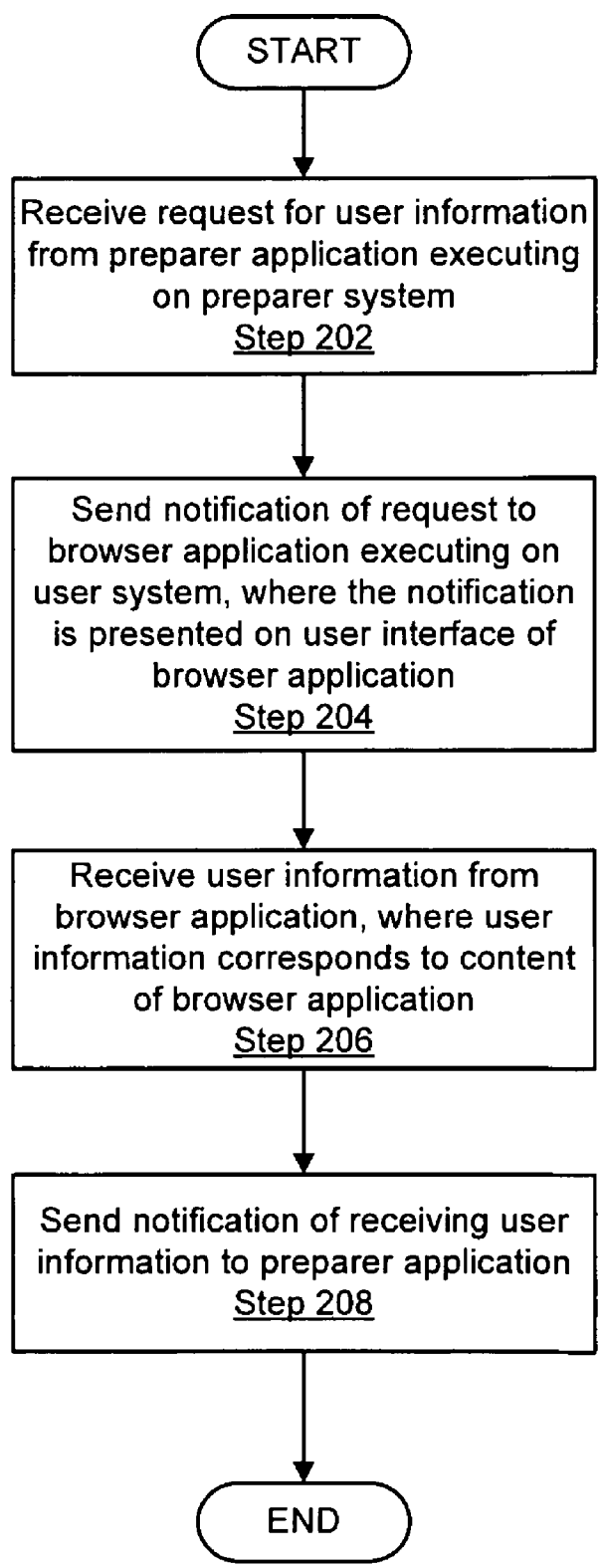
FIGS. 2-3 show flow charts in accordance with one or more embodiments of the invention.

FIG. 2 shows a flow chart for collecting information in accordance with one or more embodiments of the invention. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

In Step 202, a request for user information is received from a preparer application. The preparer application may be executing on a computer system associated with the preparer. Those skilled in the art will appreciate that the request may include a variety of information associated with collecting the user information (e.g., guidance for obtaining user information, a due date for the user information, preparer information associated with the preparer, a security key, a user associated with the requested user information, etc.). In one or more embodiments of the invention, the request for user information may be submitted as one of a number of requests for user information. In this case, the requests for user information may be processed, as described in these steps, individually or simultaneously. In one or more embodiments of the invention, the request for user information may then be stored in a data source.

At this stage, a notification of the request for user information may be sent to a browser application (Step 204). The browser application may be executing on a computer system associated with the user. Further, interactions with the browser application may occur through a browser extension. In one or more embodiments of the invention, the notification of the request may be sent in response to a query from the browser application. For example, while the browser application is loading or at some other stage in the execution of the browser application, the browser application may send a query for requests of user information associated with the user. Optionally, a direct notification of the request for user information may also be sent to the user. In one or more embodiments of the invention, the requests for user information may then be presented on a user interface of the browser application. For example, an alert may be displayed on a status bar of the browser application. In this example, the user may access a detailed list of the requests for user information by selecting the alert in the status bar. In another example, the user may be notified of the request for user information using an entry in a toolbar of the browser application. In this example, the color of the entry in the toolbar may be updated based on the status of the request for user information (e.g., red for urgent request(s), yellow for pending request(s), blue for no pending requests, etc.).

Optionally, in one or more embodiments of the invention, the browser extension of the browser application may proactively notify the user of a request for user information. For example, the browser extension may automatically present a request for user information to the user based on a due date of the request. In another example, the browser extension may automatically present a request for user information to the user when the user navigates to a web address related to the request.

In one or more embodiments of the invention, the browser application may only accept requests for user information from specific preparer(s). For example, the user may be associated with a specific preparer that is authorized to request user information from the user. In this example, requests for information initiated by someone other than the specific preparer are not processed.

Continuing with FIG. 2, in one or more embodiments of the invention, the user information may be received from the browser application (Step 206). The user information may correspond to content of the browser application collected by the user. For example, the user may capture a web page being displayed in the browser application as HTML or as an image. Further, the user may associate the user information with the request for user information while collecting the user information. Optionally, when associating the user information with the request, the user may also verify information associated with the request. For example, the user may verify the preparer information associated with the request to ensure that the preparer is authorized to receive the user information. In another example, the user may verify the user information to ensure the correct user information was captured from the browser application. In another example, the user may verify and/or modify the destination of the user information. In one or more embodiments of the invention, the user information may then be stored in a data source.

In one or more embodiments of the invention, a notification of receiving the user information may be sent to the preparer application (Step 208). In one or more embodiments of the invention, the notification of receiving may be sent in response to a query from the preparer application. For example, the browser application may send a query for requests for user information associated with the preparer. In this example, the preparer may review the status of the preparer's request and notice that the request for user information has been fulfilled. Optionally, a direct notification of receiving the user information may also be sent to the preparer. At this stage, in one or more embodiments of the invention, the preparer may use the user information to provide services for the user. For example, the preparer may use the user information to prepare documentation as requested by the user.

In one or more embodiments of the invention, the preparer application may only access user information associated with specific users(s). For example, the preparer may only be authorized to request and access user information from specific user(s).

Optionally, the preparer may then reinitiate the request for user information. For example, if the preparer finds that incorrect user information was submitted or that additional user information is required, the preparer may reject the user information and send an updated request for the user information. In this example, the preparer may add a comment to the request for user information specifying the reason for the updated request for user information. At this stage, Steps 204-208 may be repeated in order to obtain updated user information. Those skilled in the art will appreciate that the request for user information may be reinitiated as described above any number of times.

Figure 3:
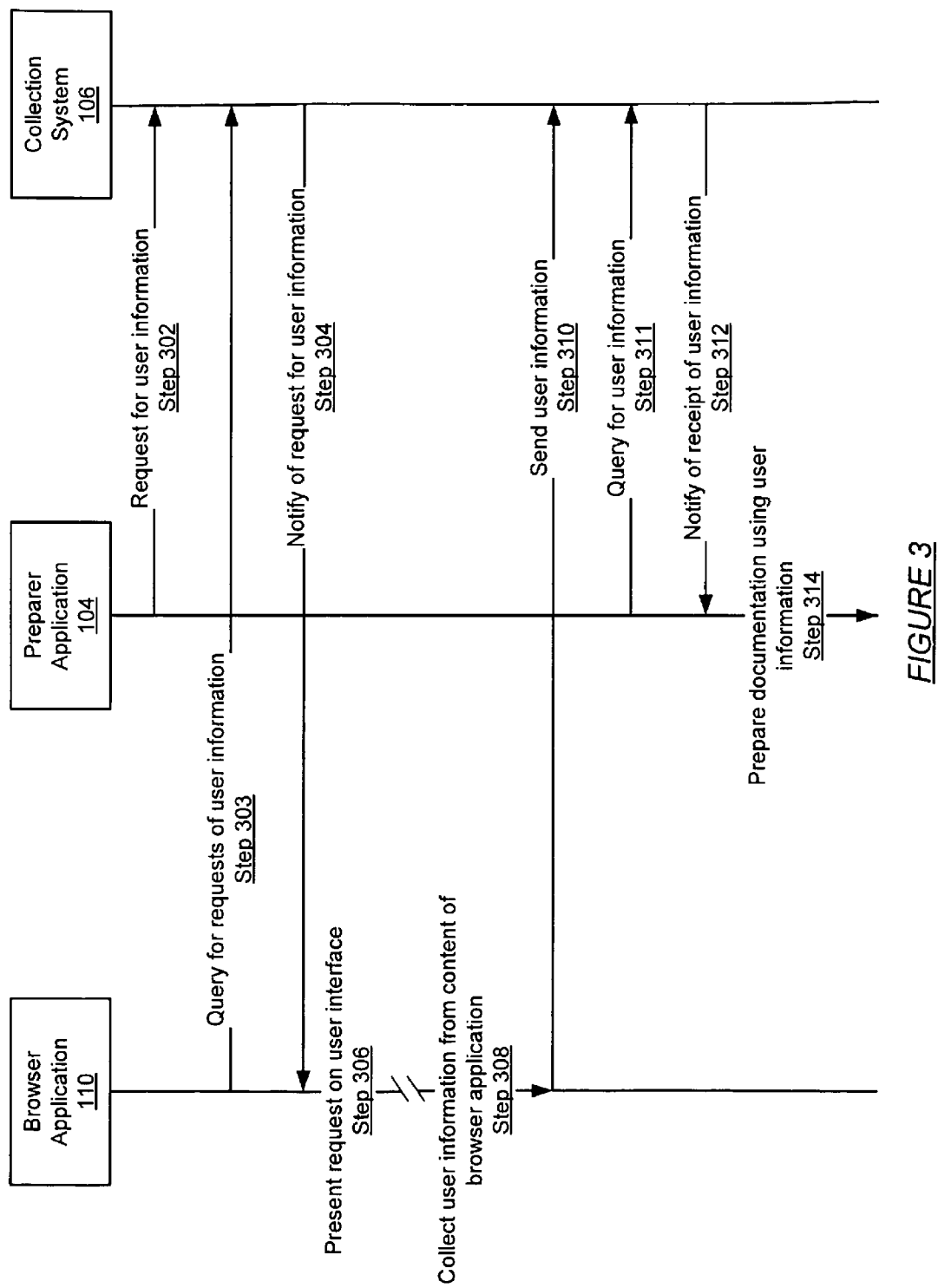

FIG. 3 shows a flow chart for presenting collection information in accordance with one or more embodiments of the invention. In one or more embodiments of the invention, one or more of the steps shown in FIG. 3 may be omitted, repeated, and/or performed in a different order than that shown in FIG. 3. Accordingly, the specific arrangement of steps shown in FIG. 3 should not be construed as limiting the scope of the invention.

In Step 302, a request for user information may be sent from the preparer application to the collection. For example, a preparer may use the preparer application to submit a request for bank statement information from a user for use in a tax return. Next, a query for requests of user information may be sent from the browser application to the collection (Step 303). For example, a browser extension of the browser application may send the query for requests while the browser application is loading.

In response to the query for the requests, a notification of the request for user information may be sent from the collection system to the browser application (Step 304). The notification of the request may then be presented on a user interface of the browser application (Step 306). For example, an alert of the request for user information may be displayed in the status bar of the browser application. The alert may be accessed at any time during the use of the browser application. For example, the user may browse the Internet for a period of time before noticing the alert. In this example, the user may view the request for financial documents by selecting the alert. Optionally, the request for financial documents may specify guidance for obtain the user information.

Next, the user information may be collected from the content of the browser application (Step 308). For example, the user may navigate the browser application to an online banking site. The user's bank statement information may then be captured from the online banking site as HTML or as a screen shot. When collecting the bank statement information, the user may associate the bank statement information with the request for user information.

The user information may then be sent from the browser application (110) to the collection system (106) (Step 310). Next, a query for the user information may be sent from the preparer application (106) to the collection system (106) (Step 311). For example, the preparer application (104) may send a query for the status of requests for user information associated with the preparer. In response to the query for user information, the collection system (106) may send a notification of receiving the user information to the preparer application (104) (Step 312). For example, the status of the request for bank statement information may be designated as fulfilled. The preparer application (104) may then view the bank statement information by selecting the fulfilled request.

At this stage, the preparer may use the bank statement information to prepare documentation to be used in a tax return for the user (Step 314). For example, the preparer application (104) may be a tax preparation application. The preparer may use the tax preparation application and the bank statement information to prepare the documentation for use in a tax return.

Figure 4:
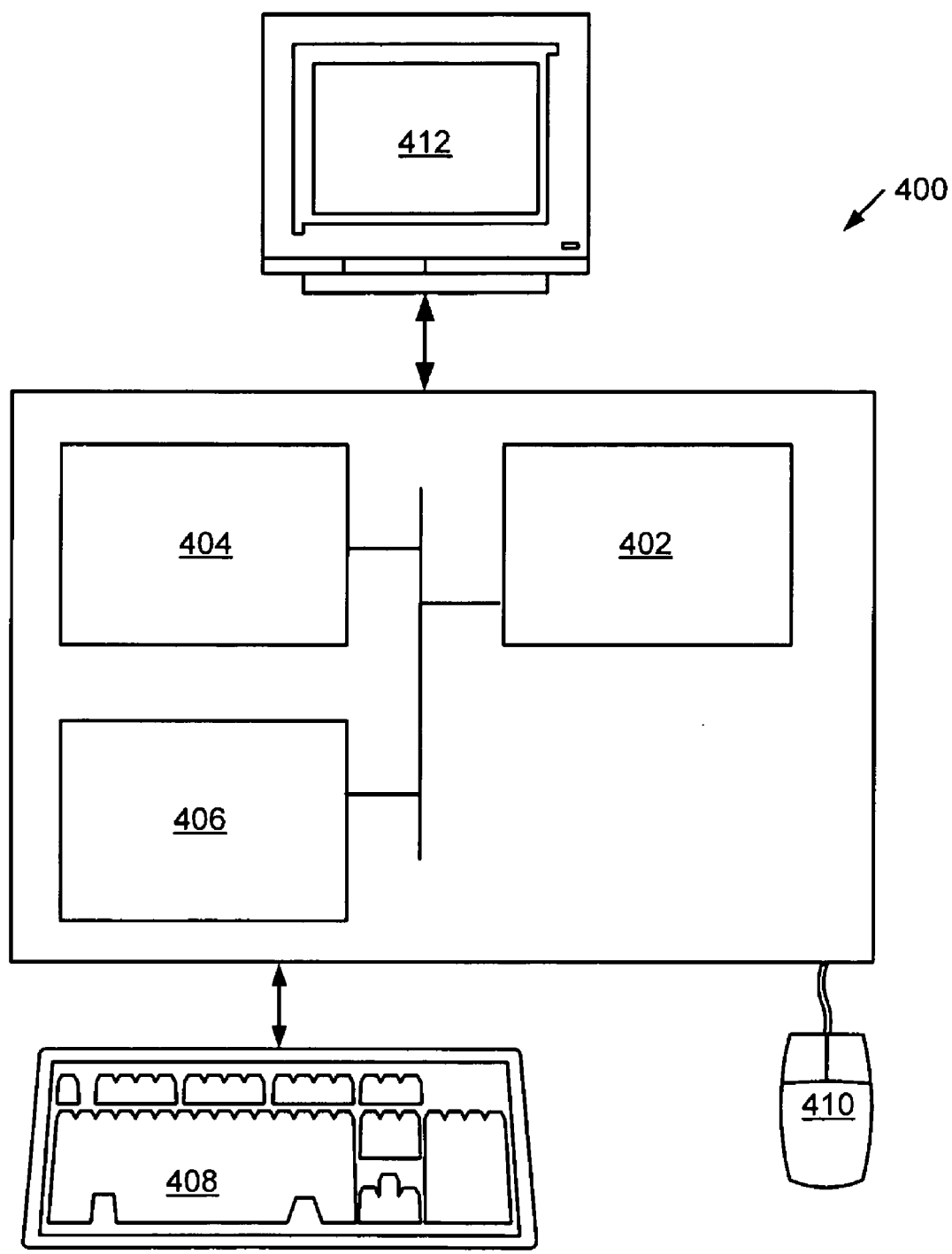
FIG. 4 shows a computer system in accordance with one or more embodiments of the invention.

The invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer (400) may be located at a remote location and connected to the other elements over a network.

Further, the invention may be implemented on a distributed system having a plurality of nodes, where each portion of the invention may be located on a different node within the distributed system. In one or more embodiments of the invention, the node corresponds to a computer system. Alternatively, the node may correspond to a processor with associated physical memory.

In one or more embodiments of the invention, software instructions to perform embodiments of the invention, when executed by a processor, may be stored on a computer readable medium such as a compact disc (CD), a diskette, a tape, a file, or any other computer readable storage device. Further, one or more embodiments of the invention may be implemented as an Application Program Interface (API) executing on a computer system(s), where the API includes one or more software instructions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for collecting information, comprising:
   receiving, by a collection system, a request for user information from a preparer application executing on a preparer system;
   sending, by the collection system, a notification of the request to a browser extension that extends functionality of a browser application executing on a user system, wherein the notification of the request comprises guidance for collecting the user information, and wherein the browser extension:
      receives the notification of the request from the collection system;
      presents the notification of the request on a user interface of the browser application, wherein a user of the user system directs, based on the guidance for collecting the user information, the web browser to a web page comprising the user information; and
      captures the user information from the web page on the browser application;
   receiving, by the collection system, the user information from the browser extension; and
   sending, by the collection system, a notification of receiving the user information to the preparer application, wherein the user information is used by the preparer application to prepare documentation.

2. The method of claim 1, further comprising determining that a preparer initiating the request for the user information is authorized to request the user information.

3. The method of claim 1, wherein the notification of the request is presented on the user interface as an alert displayed on a status bar of the browser application.

4. The method of claim 1, wherein access to the user information is restricted to the preparer application.

5. The method of claim 1, wherein the notification of the request further comprises:
   a due date for submitting the user information; and
   preparer information identifying a preparer requesting the user information.

6. The method of claim 1, wherein the guidance is determined based on historical guidance information.

7. The method of claim 1, wherein the preparer application is a tax preparation application.

8. A method for collecting information, comprising:
   receiving, by a browser extension, a notification of a request for user information from a collection system, wherein the notification of the request comprises guidance for collecting the user information, wherein the browser extension extends functionality of a browser application executing on a user system, and wherein the request is initiated by a preparer application executing on a preparer system;

presenting, by the browser extension, the notification of the request on a user interface of the browser application, wherein a user of the user system directs, based on the guidance for collecting the user information, the web browser to a web page comprising the user information;

capturing, by the browser extension, the user information from the web page on the browser application; and sending, by the browser extension, the user information to the collection system, wherein the collection system sends a notification of receiving the user information to the preparer application, wherein the user information is used by the preparer application to prepare documentation.

9. The method of claim 8, further comprising determining that a preparer initiating the request for the user information is authorized to request the user information.

10. The method of claim 8, wherein the notification of the request is presented on the user interface as an alert displayed on a status bar of the browser application.

11. The method of claim 8, wherein access to the user information is restricted to the preparer application.

12. The method of claim 8, wherein the notification of the request further comprises:
a due date for submitting the user information; and
preparer information identifying a preparer requesting the user information.

13. The method of claim 8, wherein the preparer application is a tax preparation application.

14. A system for collection information, comprising:
a preparer application interface executing on at least one computer processor and configured to:
receive a request for user information from a preparer application executing on a preparer computer system; and
send a notification of receiving the user information to the preparer application, wherein the user information is used by the preparer application to prepare documentation;
a notification module executing on the at least one computer processor and configured to:
send a notification of the request to a browser extension that extends functionality of a browser application executing on a user computer system, wherein the notification of the request comprises guidance for collecting the user information, and
wherein the browser extension:
receives the notification of the request from the collection system;
presents the notification of the request on a user interface of the browser application, wherein a user of the user system directs, based on the guidance for collecting the user information, the web browser to a web page comprising the user information; and
captures the user information from the web page on the browser application; and
a collection module executing on the at least one computer processor and configured to receive the user information from the browser extension.

15. The system of claim 14, further comprising a security module configured to determine that a preparer initiating the request for the user information is authorized to request the user information.

16. The system of claim 14, wherein the preparer application interface is further configured to restrict access to the user information to the preparer application.

17. The system of claim 14, wherein the notification of the request is presented on the user interface as an alert displayed on a status bar of the browser application.

18. The system of claim 14, wherein the notification of the request comprises:
a due date for submitting the user information; and
preparer information identifying a preparer requesting the user information.

19. The system of claim 18, wherein the preparer application interface is further configured to determine the guidance based on historical guidance information.

20. The system of claim 14, wherein the preparer application is a tax preparation application.

21. A non-transitory computer readable medium, embodying instructions executable by the computer to perform method steps for collection information, the instructions comprising functionality to:
receive, by a collection system, a request for user information from a preparer application executing on a preparer system;
send, by the collection system, a notification of the request to a browser extension that extends functionality of a browser application executing on a user system, wherein the notification of the request comprises guidance for collecting the user information, and wherein the browser extension:
receives the notification of the request from the collection system;
presents the notification of the request on a user interface of the browser application, wherein a user of the user system directs, based on the guidance for collecting the user information, the web browser to a web page comprising the user information; and
captures the user information from the web page on the browser application;
receive, by the collection system, the user information from the browser extension; and
send, by the collection system, a notification of receiving the user information to the preparer application, wherein the user information is used by the preparer application to prepare documentation.

22. The computer readable medium of claim 21, wherein the instructions further comprise functionality to determine that a preparer initiating the request for the user information is authorized to request the user information.

23. The computer readable medium of claim 21, wherein the preparer application is a tax preparation application.

24. A non-transitory computer readable medium, embodying instructions executable by the computer to perform method steps for collection information, the instructions comprising functionality to:
receive, by a browser extension, a notification of a request for user information from a collection system, wherein the notification of the request comprises guidance for collecting the user information, wherein the browser extension extends functionality of a browser application executing on a user system, and wherein the request is initiated by a preparer application executing on a preparer system;
present, by the browser extension, the notification of the request on a user interface of the browser application, wherein a user of the user system directs, based on the guidance for collecting the user information, the web browser to a web page comprising the user information;
capture, by the browser extension, the user information from the web page on the browser application; and send, by the browser extension, the user information to the collection system, wherein the collection system sends a notification of receiving the user information to the preparer application, wherein the user information is used by the preparer application to prepare documentation.

25. The computer readable medium of claim 24, wherein the instructions further comprise functionality to determine that a preparer initiating the request for the user information is authorized to request the user information.

* * * * *